(12) United States Patent  
Yang

(10) Patent No.: US 7,451,478 B2
(45) Date of Patent: Nov. 11, 2008

(54) TIME MANAGING SYSTEM AND METHOD

(75) Inventor: Kuen-Bin Yang, Taipei (TW)

(73) Assignee: Inventec Corporation, Taipei (TW)

( * ) Notice: Subject to any disclaimer, the term of this patent is extended or adjusted under 35 U.S.C. 154(b) by 811 days.

(21) Appl. No.: 11/021,240

(22) Filed: Dec. 22, 2004

(65) Prior Publication Data

US 2006/0136736 A1 Jun. 22, 2006

(51) Int. Cl.
*H04L 9/32* (2006.01)
(52) U.S. Cl. .............................. 726/2; 726/16; 726/17; 726/19
(58) Field of Classification Search ............. 726/26–30, 726/2–7, 16–19; 713/168, 182
See application file for complete search history.

(56) References Cited

U.S. PATENT DOCUMENTS 6,418,536 B1 * 7/2002 Park ........................... 713/323

2003/0110011 A1 * 6/2003 Kyotoku ..................... 702/186
2003/0189591 A1 * 10/2003 Mo ............................ 345/738

* cited by examiner

*Primary Examiner*—Hosuk Song
(74) *Attorney, Agent, or Firm*—Jianq Chyun IP Office

(57) ABSTRACT

A time managing system and method for controlling usage time of information equipment can improve security of the information equipment. The system includes a security identifying module, a setting management module, and a control operation module, and is internally built in the information equipment. The security identifying module verifies authority of an authorized person who is thus able to set a usage time limit for the information equipment via the setting management module. Therefore, the control operation module is capable of determining whether the information equipment can be accessed according to the usage time limit. If system time of the information equipment exceeds the usage time limit, the information equipment would automatically shut down. This controls the usage time of the information equipment and prevents data stored in the information equipment from being accessed by unauthorized persons.

16 Claims, 5 Drawing Sheets

TIME MANAGING SYSTEM AND METHOD

FIELD OF THE INVENTION

The present invention relates to management techniques of limiting usage time of information equipment, and more particularly, to a time managing system and method capable of setting a usage time limit for information equipment to control usage time sessions.

BACKGROUND OF THE INVENTION

Information technology is nowadays broadly applicable to fields such as social administration, communication, education and commerce. Information equipment has also become an essential electronic consumer product for every family. Thus, it is considered important for humans to acquire general operating knowledge and application skills relevant to the information equipment as early as possible.

For most families, however, it is not easy to make all children have a positive learning attitude with the use of the information equipment. As teenagers often lack an ability to tell right from wrong and to appropriately control and manage themselves, long-term addiction to virtual cyberspace and computer games not only causes them to be unable to concentrate on studying but also leads to unhealthy mental and physical development. Therefore, these teenagers may suffer "Internet Addition Disorders (IAD)" or other physiological syndromes due to abuse of the information equipment.

Thus, if usage time of the information equipment can be strictly controlled, the time spent on the information equipment by the teenager would be limited according to practical situations while preventing data stored in the information equipment from being stolen or accessed without authorization of the owner of the information equipment.

In light of the above problem, it has been proposed a power lock applicable to information equipment, by which the power lock is able to cut off internal circuits of the information equipment such that the information equipment cannot be switched on and an unauthorized user is unable to operate the information equipment. However, this method is not perfect as it reduces opportunities for the teenagers to use the information equipment and influences their basic abilities of operating the information equipment.

Accordingly, Chinese Patent No. 02289108.0 has disclosed a "Computer Timing Shutdown Device", as shown in FIG. 1, which comprises a computer 1, an external control unit 2, and an actuating unit 3 that is connected to the computer 1 via a connector 32 and connected to the external control unit 2 via a connector 33. By inserting a key element 4 into a keyhole 31 of the actuating unit 3, a usage time limit of the computer 1 can be initiated and set. When the key element 4 is removed from the actuating unit 3, a timing mode is immediately activated and the computer 1 would automatically shuts down if usage time has exceeded the set usage time limit. Such computer timing shutdown device with a usage time limit, however, still has significant drawbacks. Firstly, a user needs to additionally purchase this device for timing control and thus increases the expenditure thereof. Secondly, as the timing shutdown device cannot be locked onto the computer, the user needs to remove this device when operating the computer. In such case, the function of limiting usage time would fail. Thirdly, if the key element of the timing shutdown device is lost, the user is unable to cancel the set usage time limit, thereby causing inconvenience in use.

Therefore, the problem to be solved herein is to provide a simple and efficient technique for limiting usage time of the information equipment, by which unlimited use of the information equipment by teenagers can be avoided and data stored in the information equipment can be prevented from being easily stolen or accessed by unauthorized users.

SUMMARY OF THE INVENTION

In light of the above prior-art drawbacks, a primary objective of the present invention is to provide a time managing system and method capable of controlling usage time of information equipment (such as a personal computer, notebook computer, and personal digital assistant), by which a function option capable of setting a usage time limit of the information equipment is internally constructed in the information equipment, such that the information equipment is able to determine and control the usage time provided thereby, and also prevent the information equipment can be prevented from being used by unauthorized users and data stored therein can be protected from being accessed without authorization.

In accordance with the above and other objectives, the present invention proposes a time managing system and method.

The time managing system is internally built in information equipment, and comprises (1) a security identifying module for setting an identification password and recognizing authority for setting a usage time limit of the information equipment according to the identification password; (2) a setting management module for providing a time setting interface according to the recognized authority, such that the usage time limit can be set and stored; and (3) a control operation module for repeatedly comparing the usage time limit to system time provided by a system timing function of the information equipment, such that the information equipment would shut down if the comparison results shows the usage time limit being exceeded.

Furthermore, when a user intends to use the information equipment beyond the set usage time limit, the security identifying module provides a password input interface for the user to enter a corresponding identification password. After the entered password has been successfully proved according to the set identification password, the control operation module cancels the set usage time limit, such that the user is able to continuously operate the information equipment without any time limit. In such case, if the user does not reset a usage time limit of the information equipment, the information equipment would control usage thereof according to the previously set usage time limit when the information equipment is switched on next time. Alternatively, the time managing system can be built in a BIOS (basic input/output system) setting program of the information equipment, and a function actuating control module is used in place of the security identifying module to determine whether a BIOS setup password for the information equipment has been activated. When the BIOS setup password has been activated, a function of setting a usage time limit for the information equipment can be initiated to ensure that only an authorized person with BIOS setting authority is able to set the usage time limit of the information equipment. This prevents the set usage time limit of the information equipment from being modified by unauthorized persons.

The present invention also proposes a time managing method comprising the steps of: having a security identifying module determine whether a user has authority for setting a usage time limit of information equipment according to an identification password being entered by the user; after the entered password has been successfully proved by the security identifying module, having a setting management module provide a time setting interface for the user to set the usage time limit, and storing the setting data in a memory unit; and during operation of the information equipment, having a control operation module repeatedly determine whether system time of the information equipment falls within the set usage time limit according to the setting data stored in the memory unit; if no, the information equipment automatically shuts down. The method further comprises the steps of: (a) when the user switches the information equipment on, having the control operation module determine whether a usage time limit of the information equipment has been set; if no, allowing the user to directly enter an operating system of the information equipment to perform operation; if yes, proceeding to step (b); and (b) having the control operation module determine whether the system time of the information equipment falls within the set usage time limit according to the setting data stored in the memory unit; if yes, allowing the user to enter the operating system of the information equipment; if no, allowing the information equipment to automatically shut down. Further, if the user operates the information equipment beyond the set usage time limit, the security identifying module provides a password input interface for the user to enter a corresponding identification password. After the entered password has been successfully proved, the control operation module cancels the set usage time limit to allow the user to continuously use the information equipment.

Therefore, the time managing system and method according to the present invention provide a setting program for controlling usage time of information equipment, such that the information equipment is able to control the usage time provided thereby according to time limit data set by an authorized person. This prevents the information equipment from being used by unauthorized persons, and also prevents data stored in the information equipment from being accessed and compromised without authorization.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
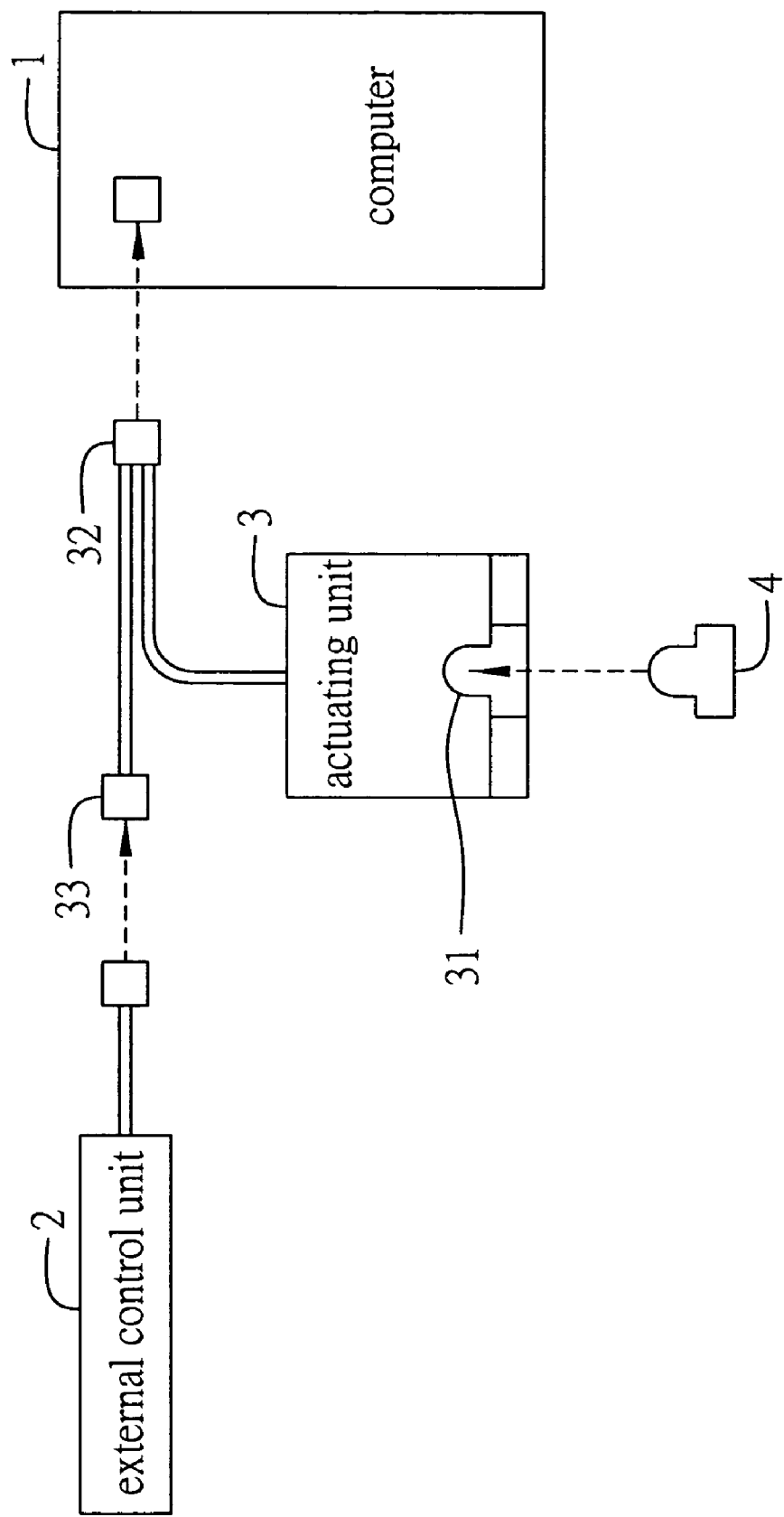
FIG. 1 (PRIOR ART) is a schematic block diagram showing a conventional timing shutdown device for information equipment.
Figure 2A:
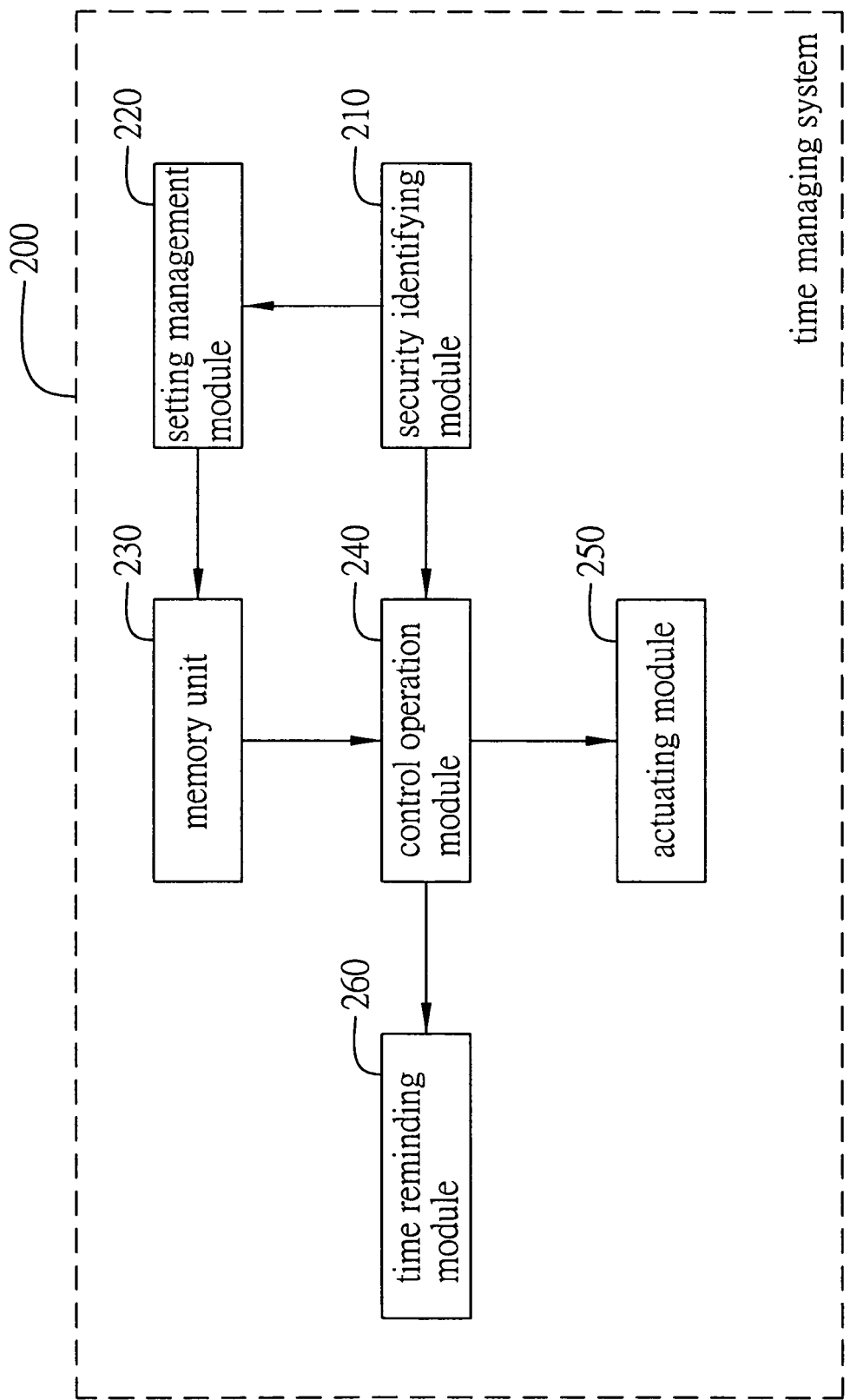
FIG. 2A is a schematic block diagram showing a time managing system according to a preferred embodiment of the present invention.

FIG. 2A is a block diagram showing architecture of a time managing system according to a preferred embodiment of the present invention. In this embodiment, the time managing system 200 is internally built in information equipment (not shown) and comprises a security identifying module 210, a setting management module 220, a memory unit 230, a control operation module 240, an actuating module 250, and a time reminding module 260.

The security identifying module 210 is used for an authorized user to set an identification password, and provides an interface for the user to enter a corresponding identification password when the user intends to set a usage time limit for the information equipment. The security identifying module 210 also verifies correctness of the password entered by the user according to the set identification password so as to determine whether the user has authority to use the information equipment.

After the password has been successfully proved by the security identifying module 210, the setting management module 220 provides a time setting interface for the user to set the usage time limit for the information equipment, and the setting data are stored in the memory unit 230. The setting data may include switch-on time and shutdown time of the information equipment as well as dates.

During operation of the information equipment, the control operation module 240 can repeatedly determine whether the time provided by a system timing function of the information equipment exceeds the set usage time limit according to the setting data stored in the memory unit 230. If yes, the actuating module 250 activates a central processing unit (not shown) of the information equipment to perform a shutdown procedure. The time of the information equipment read by the control operation module 240 is system time of the information equipment. A main menu of a BIOS (basic input/output system) setting program of the information equipment provides options of system date and system time for the user to set the system time and date of the information equipment, thereby providing the system timing function for the information equipment.

When the system time of the information equipment approaches the usage time limit set for the information equipment, the time reminding module 260 automatically displays a shutdown timing interface to remind the user that the information equipment would shortly shut down unless the user enters the password to gain authority for continuous usage of the information equipment or store unsaved data.

Figure 2B:
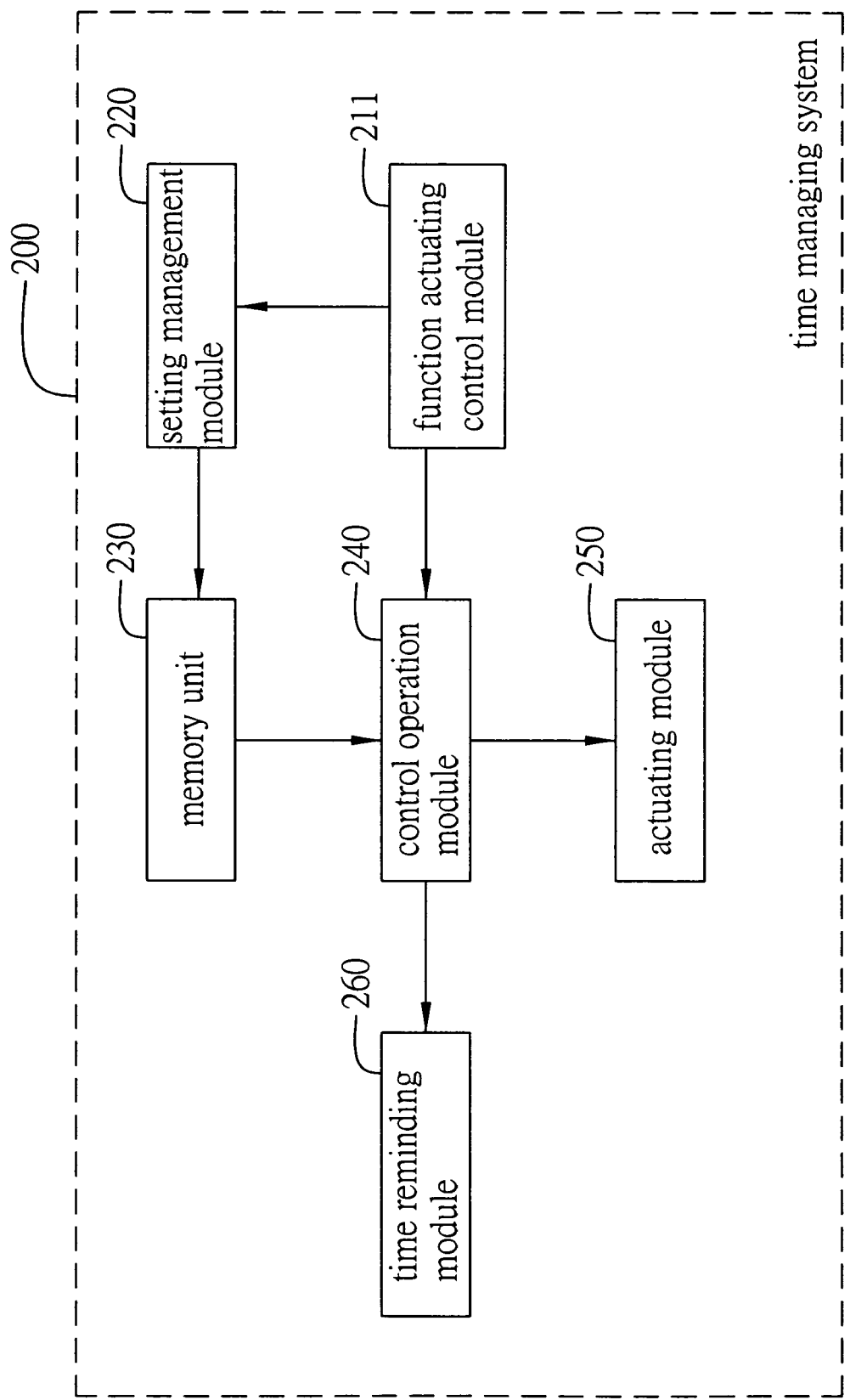
FIG. 2B is a schematic block diagram showing the time managing system according to another preferred embodiment of the present invention.

FIG. 2B is a block diagram showing the time managing system 200 according to another preferred embodiment of the present invention. In this embodiment, the time managing system 200 is internally built in the BIOS setting program of the information equipment and comprises a function actuating control module 211, a setting management module 220, a memory unit 230, a control operation module 240, an actuating module 250, and a time reminding module 260.

The function actuating control module 211 serves to determine whether a BIOS setup password for the information equipment has been activated. In other words, when the BIOS setup password has been activated, function options of setting a usage time limit for the information equipment can be initiated.

The setting management module 220 is a function setting program in the BIOS setting program of the information equipment. The setting management module 220 can add a function block "limit power on" to the current BIOS setting program of the information equipment to allow an authorized user to set the usage time limit. In this embodiment, a default state of the function block is "disable". Before initiating the function block to perform relevant settings, the user needs to set a BIOS setup password. This achieves a time managing function and prevents unauthorized users from entering the BIOS setting program to modify the data such as the usage time limit of the information equipment. Similarly, if the user intends to operate the information equipment beyond the set usage time limit, the correct BIOS setup password must be entered.

Moreover, the functions and procedures executed by the memory unit 230, the control operation module 240, the actuating module 250 and the time reminding module 260 are the same as those described in the foregoing embodiment and therefore are not to be further repeated here.

Figure 3:
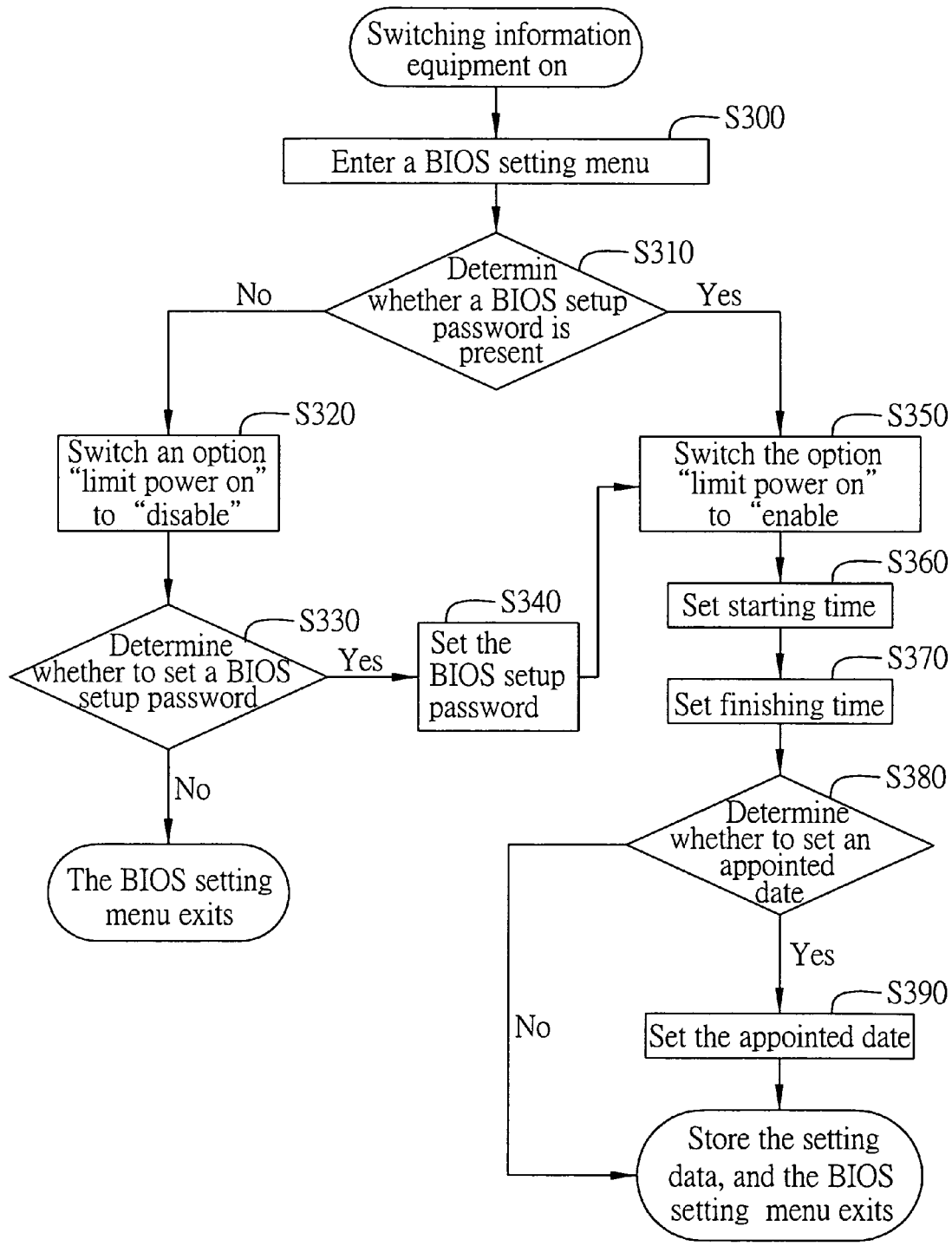
FIG. 3 is flowchart showing setting of a usage time limit for information equipment via a time managing method according to the present invention.

FIG. 3 is flowchart showing setting of a usage time limit via a time managing method according to the present invention. This time managing method is particularly applicable to the foregoing time managing system 200 that is internally built in a BIOS setting program of information equipment. Referring to FIG. 3, in Step S300, after a user switches on the information equipment, the user firstly presses a function key to enter a BIOS setting menu. The function key to enter the BIOS differs between different brands and types of the information equipment. For example, a general desktop computer uses the "Del" key to enter the BIOS setting menu, whereas a general notebook computer uses the "Esc" or "F10" key to enter the BIOS setting menu. Then, Step S310 is performed.

In Step S310, the function actuating control module 211 determines whether a BIOS setup password is present. If no, Step S320 is performed; if yes, Step S350 is performed.

In Step S320, an option "limit power on" displayed in the BIOS setting menu is switched to "disable". Then, Step S330 is performed.

In Step S330, the user decides whether to set a BIOS setup password. If the user decides to set the BIOS setup password, Step S340 is performed. If no, the BIOS setting menu exits without any modification.

In Step S340, the user sets the BIOS setup password according to setting pages and messages provided by the information equipment. Then, Step S350 is performed.

In Step S350, the user switches the state of the option "limit power on" to "enable". Then, Step S360 is performed.

In Step S360, the user enters a time setting interface to set starting time of a usage time limit of the information equipment. Then, Step S370 is performed.

In Step S370, the user sets finishing time of the usage time limit of the information equipment via the time setting interface. Then, Step S380 is performed.

In Step S380, the user determines whether to set an appointed date depending on practical requirements. If no, the BIOS setting menu exits after the setting data are stored. If yes, Step S390 is performed.

In Step S390, the user initiates a date setting function and enters the appointed date in the time setting interface. After storing the setting date data, the BIOS setting menu exits.

Figure 4:
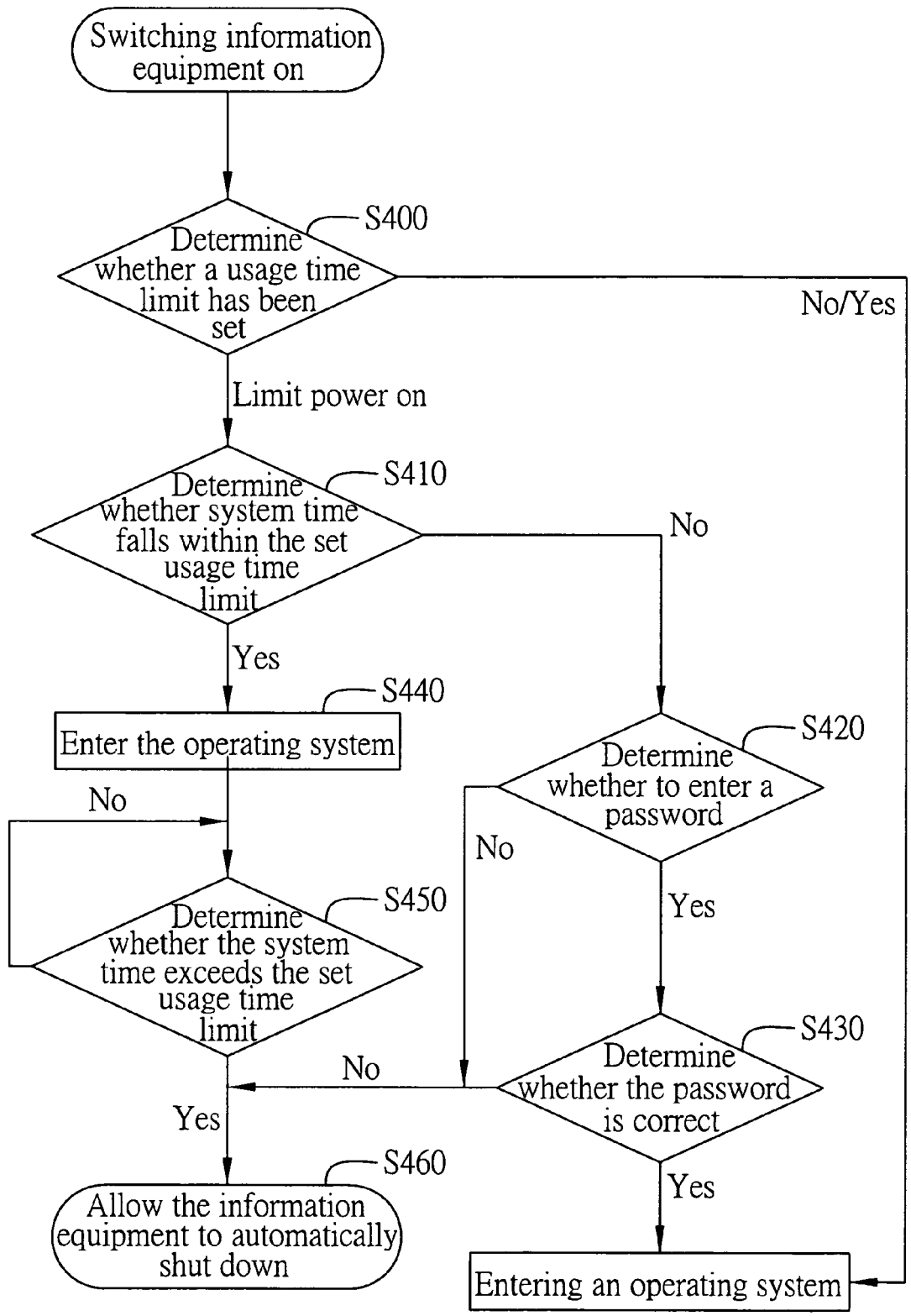
FIG. 4 is a flowchart showing operation performed by the time managing method according to the present invention.

FIG. 4 is a flowchart showing operation of the time managing method according to the present invention. Referring to FIG. 4, in Step S400, after the user switches on the information equipment, the control operation module 240 determines whether a usage time limit has been set. If no, the user can directly enter an operating system of the information equipment; if yes, Step S410 is performed.

In Step S410, the control operation module 240 determines whether system time of the information equipment falls within the set usage time limit. If no, Step S420 is performed; if yes, Step S440 is performed.

In Step S420, a message, for example, "Please enter a password as the time does not fall within the set usage time limit", is displayed on a screen of the information equipment to make the user decide whether to enter a password. If yes, Step S430 is performed; if no, Step S460 is performed.

In Step S430, the user enters the password and the information equipment identifies whether the entered password is correct. If the password is correct, the user gains access to the operating system of the information equipment. If the password is not correct, Step S460 is performed.

In Step S440, the user gains access to the operating system of the information equipment. Then, Step S450 is performed.

In Step S450, the control operation module 240 repeatedly determines whether the system time of the information equipment exceeds the set usage time limit. If no, this determination procedure is repeated. If yes, Step S460 is performed. In case the control operation module 240 determines that the system time is close to the finishing time of the set usage time limit (for example, 5 minutes before the finishing time), the time reminding module 260 automatically outputs a message, for example, "The information equipment will automatically shut down after five minutes", on the screen of the information equipment to remind the user to take a corresponding action, for example, entering the password to gain authority for continuous usage of the information equipment or store unsaved data.

In Step S460, the control operation module 240 notifies the actuating module 250 to activate a central processing unit of the information equipment to execute a shutdown procedure.

The following four conditions are provided to illustrate the operating procedures of the present invention.

Condition 1: A password has not been set. The option "limit power on" is in a "disable" state, and the information equipment directly enters the operating system thereof after being switched on.

Condition 2: A password has been set, but a usage time limit has not been set. The information equipment can enter the operating system thereof after being switched on.

Condition 3: A password has been set, and a usage time limit has been set as:

Starting time 18:30:00

Finishing time 21:00:00

Date limit option: disable

In this case, the user is able to operate the information equipment everyday during the period from 18:30 till 21:00 at which time the information equipment shuts down automatically.

Condition 4: A password has been set, and a usage time limit and a date limit have been set as:

Starting time 18:30:00

Finishing time 21:00:00

Date limit option: 03-12 (Press the space key to change the status to "enable")

In this case, the user is only able to operate the information equipment during the period from 18:30 to 21:00 on March 12.

Therefore, the time managing system and method proposed in the present invention add a function block of setting a usage time limit to the current BIOS setting program in the information equipment, so as to allow an authorized person to set the usage time limit and monitor system time of the information equipment according to the setting data. If the system time exceeds the set usage time limit, the information equipment would automatically shut down. This thus achieves a function of limiting usage time for the information equipment.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A time managing system internally built in information equipment having a system timing function, for controlling usage time of the information equipment, the time managing system comprising:
   a security identifying module for setting an identification password and recognizing authority for setting a usage time limit of the information equipment according to the identification password;
   a setting management module for providing a time setting interface according to the recognized authority, such that the usage time limit of the information equipment is set and stored;
   a control operation module for repeatedly comparing the set usage time limit to system time provided by the system timing function of the information equipment, so as to control the information equipment to shut down if the system time exceeds the set usage time limit; and
   a time reminding module for automatically displaying a shutdown timing interface to remind a user that the information equipment would shortly shut down when the system time of the information equipment approaches the set usage time limit.

2. The time managing system of claim 1, wherein the security identifying module provides a password input interface for a user to enter a corresponding identification password when the user needs to operate the information equipment beyond the set usage time limit, and after entered password has been successfully verified according to the set identification password, the control operation module cancels the set usage time limit, such that the user is able to continuously use the information equipment, and the previously set usage time limit of the information equipment is to be reactivated when the information equipment is switched on next time.

3. The time managing system of claim 1, wherein settings for the usage time limit include setting starting time, setting finishing time, and setting an appointed date.

4. The time managing system of claim 1, further comprising a memory unit for storing the set usage time limit.

5. A time managing system internally built in a basic input/output system (BIOS) setting program of information equipment having a system timing function, for controlling usage time of the information equipment, the time managing system comprising:
   a function actuating control module for setting a BIOS setup password and recognizing authority for setting a usage time limit of the information equipment according to the BIOS setup password;
   a setting management module for providing a time setting interface according to the recognized authority, such that the usage time limit of the information equipment is set and stored; and
   a control operation module for repeatedly comparing the set usage time limit to system time provided by the system timing function of the information equipment, so as to control the information equipment to shut down if the system time exceeds the set usage time limit.

6. The time managing system of claim 5, wherein the setting management module is s function setting program in the IBOS setting program of the information equipment.

7. The time managing system of claim 5, wherein settings for the usage time limit include setting starting time, setting finishing time, and setting an appointed date.

8. The time managing system of claim 5, further comprising a time reminding module for automatically displaying a shutdown timing interface to remind a user that the information equipment would shortly shut down when the system time of the information equipment approaches the set usage time limit.

9. The time managing system of claim 5, further comprising a memory unit for storing the set usage time limit.

10. A timing managing method applicable to information equipment having a system timing function, for controlling usage time of the information equipment via a time managing system, the time managing method comprising the steps of:
    determining via the a time managing system authority for setting s usage time limit of the information equipment according to an identification password entered by a user;
    providing via the time managing system a time setting interface according to the recognized authority for the user to set the usage time limit of the information equipment, and storing the set usage time limit; and
    repeatedly comparing via the time managing system the usage time limit to system time provided by the system timing function of the information equipment, so as to control the information equipment to shut down if the system time exceeds the usage time limit,
    wherein the time managing system comprises a setting management module, a control operation module, a memory unit, and a time reminding module.

11. The timing managing method of claim 10, wherein settings for the usage time limit include setting starting time, setting finishing time, and setting an appointed date.

12. The timing managing method of claim 10, wherein the BIOS setting program provides the system timing function for the information equipment and sets the system time.

13. The timing managing method of claim 10, further comprising the steps of:
    determining via the control operation module whether the usage time limit of the information equipment has been set; if no, directly gaining access to an operating system of the information equipment; and
    determining via the control operation module whether the system time falls within the set usage time limit according to data stored in the memory unit of the time managing system; if yes, gaining access to the operating system of the information equipment.

14. The timing managing method of claim 10, further comprising a step of automatically displaying via the time reminding module a shutdown timing interface to remind the user that the information equipment would shortly shut down when the system time of the information equipment approaches the set usage time limit.

15. The timing managing method of claim 10, wherein the timing managing system further comprises a security identifying module that provides a password input interface for the user to enter a corresponding identification password when the user needs to operate the information equipment beyond the set usage time limit, and after the entered password has been successfully verified, the control operation module cancels the set usage time limit, such that the user is able to continuously operate the information equipment, and the previously set usage time limit of the information equipment is to be reactivated when the information equipment is switched on next time.

16. The timing managing method of claim 10, wherein the timing managing system further comprises a function actuating control module for setting a BIOS setup password and recognizing authority for setting the usage time limit of the information equipment according to the BIOS setup password.

* * * * *